T. D. LITTLE.
PEANUT PLANTER.
APPLICATION FILED AUG. 7, 1916.
1,222,113.
Patented Apr. 10, 1917.
2 SHEETS—SHEET 1.
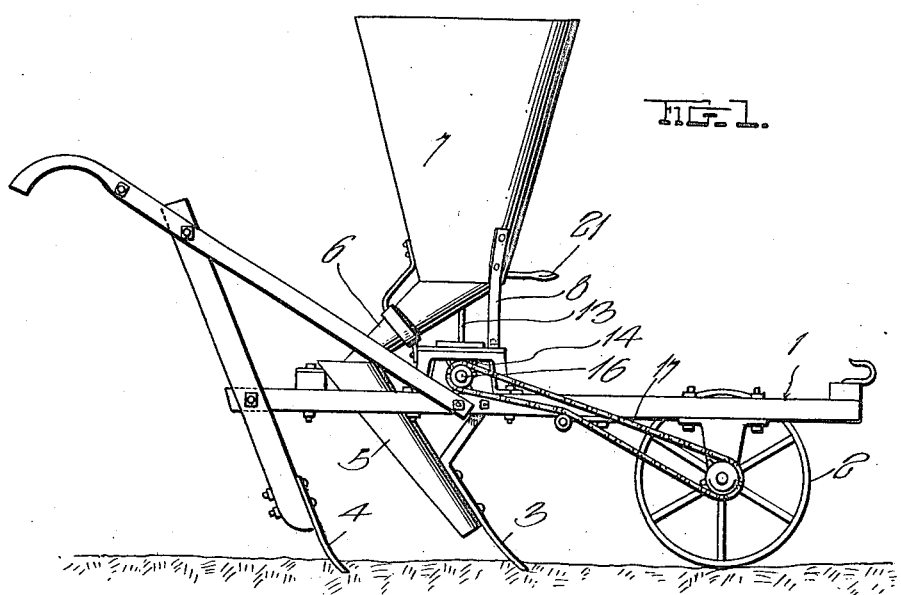
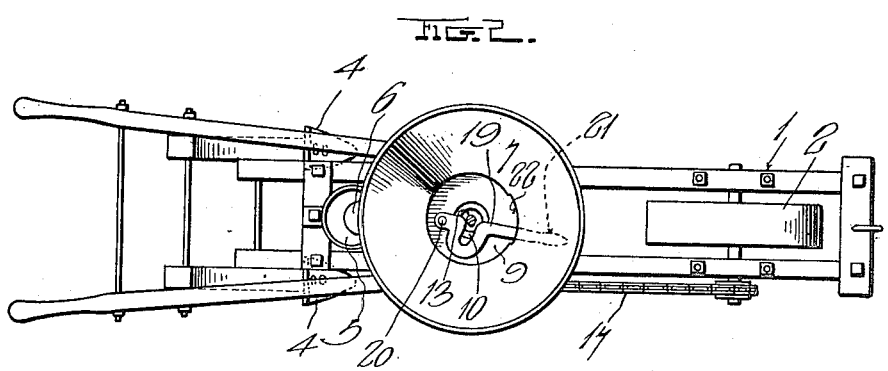
Witness
H. Woodard
Inventor
Thomas Dewitt Little
By H. B. Willson & Co.
Attorneys

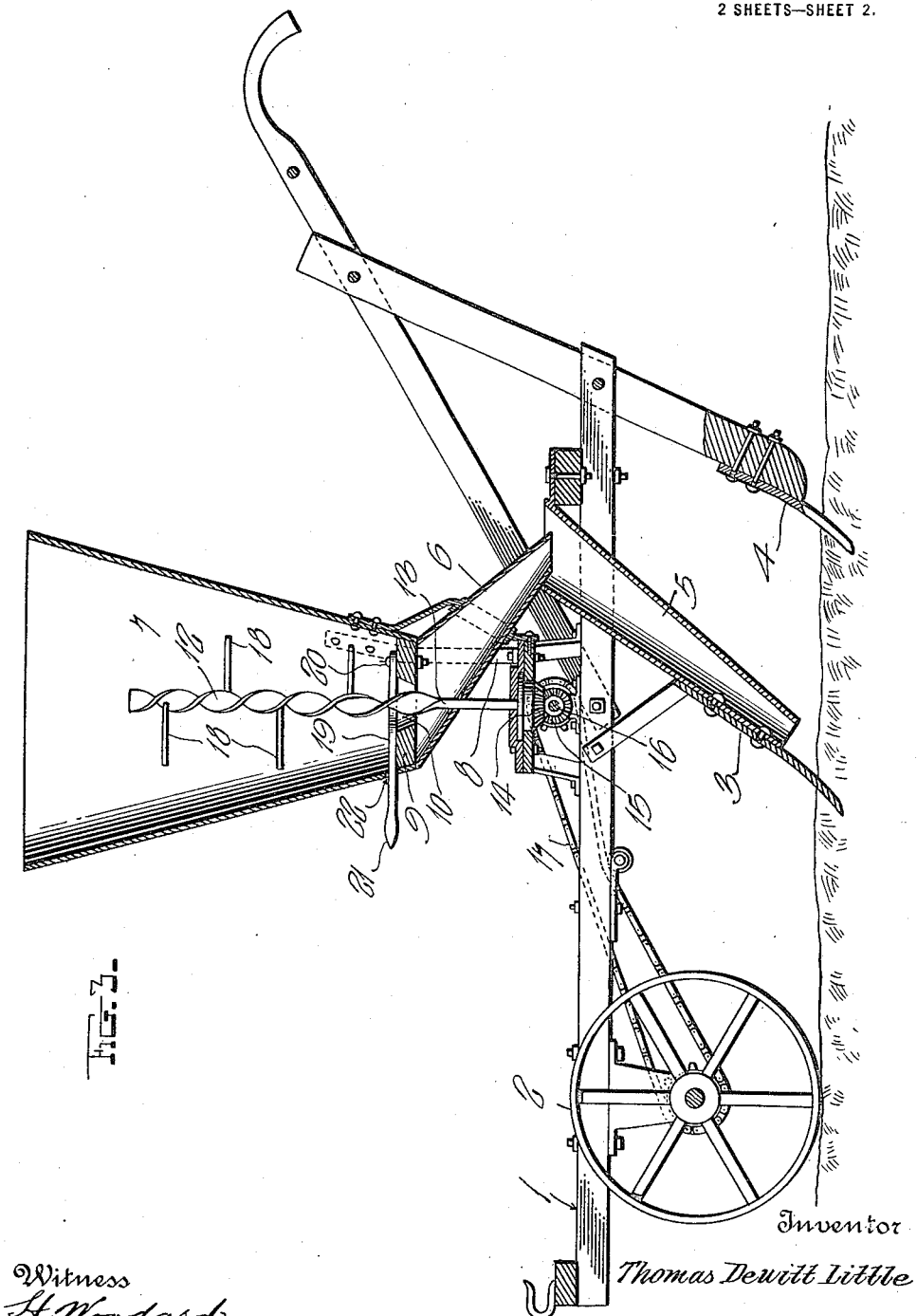

UNITED STATES PATENT OFFICE.

THOMAS DEWITT LITTLE, OF DOTHAN, TEXAS.

PEANUT-PLANTER.

1,222,113.  Specification of Letters Patent.  Patented Apr. 10, 1917.

Application filed August 7, 1916. Serial No. 113,661.

*To all whom it may concern:*

Be it known that I, THOMAS DEWITT LITTLE, a citizen of the United States, residing at Dothan, in the county of Eastland and State of Texas, have invented certain new and useful Improvements in Peanut-Planters; and I do declare the following to be a full, clear, and exact description of the invention, such as will enable others skilled in the art to which it appertains to make and use the same.

My invention relates broadly to improvements in agricultural machines, and has for its object to provide a simply constructed and inexpensive mechanism by whose use peanuts may be planted without removing the hulls therefrom and without crushing these hulls.

With this general object in view the invention resides in certain novel features of construction and in unique combinations of parts to be fully described and claimed, the descriptive matter being supplemented by the accompanying drawings which constitute a part of this application and in which:—

Figure 1 is a side elevation of the improved machine;

Fig. 2 is a top plan view thereof; and,

Fig. 3 is a central vertical longitudinal section.

In specifically describing the structure shown in the drawings above briefly described, similar characters will be employed to designate corresponding parts throughout the several views and reference will be herein made to the numerous elements by their respective indices. To this end the numeral 1 designates a suitable frame supported at its front end by a wheel 2 while between its ends said frame is provided with a depending plow 3 disposed on its longitudinal center and adapted to form a furrow in which the peanuts are to be planted. A pair of covering shovels 4 are spaced in rear of the shovel 3 to cover the row of nuts as the same are planted. A chute 5 is disposed in rear of shovel 3 for conducting the nuts into the furrow formed thereby, and delivering into the upper end of said chute 5 is a second chute 6 which depends from a hopper 7 mounted in any preferred manner on the frame 1 but preferably supported therefrom by a pair of rigid bars 8. The features of construction so far briefly described are shown only for illustrative purposes and may vary as occasion may demand.

The hopper 7 is preferably funnel-shaped as shown and is elongated vertically, the bottom 9 of said hopper having a central opening 10 which is chamfered to increase the diameter thereof from its lower to its upper end. A vertically disposed worm 12 is located in the hopper 7 on the vertical axis thereof, said worm being preferably formed of a single metal bar twisted as shown, the lower end of said bar extending through the opening 10 and being suitably shaped to constitute a shaft 13. For illustrative purposes shaft 13 is shown as provided with a gear 14 on its lower end, said gear meshing with a pinion 15 on a transverse shaft 16 which is driven from the wheel 2 by means of a sprocket chain 17. Sufficient space prevails between the shaft 13 and the wall of the opening 10 to permit the unshelled nuts to drop into the chute 6, and the worm 12 serves to move the nuts around the same upwardly, thus preventing them from packing or clogging at the lower end of the hopper, said worm preferably having radiating fingers 18 which serve to loosen the peanuts in the hopper 7 to permit them to more readily feed downwardly. Worm 12, in addition to moving the nuts in the manner set forth, tends to convey any sticks or other trash to the top of the hopper from which it may be removed.

For sufficiently closing the opening 10 to diminish the discharge of the nuts therefrom, an arcuate valve plate 19 overlies the bottom 9 and is pivoted thereto as shown at 20, said plate having a handle 21 extending through a slot 22 in the lower end of the hopper whereby it may be swung laterally to properly set the valve plate.

By constructing the improved machine in the manner shown and described or substantially in this way, it will be obvious that it will be highly efficient and will permit planting of peanuts without the necessity of hulling the same. Furthermore the hulls will not be crushed and thus the germinating qualities of the nuts will not be impaired. It will be evident from the foregoing that the most salient feature of the invention is the worm 12 and its location in respect to the hopper and its delivery opening, and in view of this I do not wish to be limited to any particular application of these parts since they may be used in connection with numerous other features of construction but will nevertheless perform the functions above set forth.

I claim:

1. A peanut planter comprising a portable frame, a hopper mounted thereon and having in its bottom a delivery opening, means for conducting the peanuts from this opening into the earth, a vertically disposed peanut lifting worm in said hopper for moving the nuts therein upwardly to prevent clogging of the delivery opening, and means for driving said worm.

2. A peanut planter comprising a portable frame, a hopper mounted thereon and having a delivery opening in its bottom, means for conducting the nuts from said opening into the earth, a vertical peanut lifting worm disposed in said hopper and having its lower end positioned in the delivery opening, means for driving said worm in a direction to cause the same to move the nuts upwardly to prevent clogging of said opening, and radiating fingers carried by said worm for loosening the nuts in the hopper.

In testimony whereof I have hereunto set my hand in the presence of two subscribing witnesses.

THOMAS DEWITT LITTLE.

Witnesses:
WILLIE W. HARPER,
JAMES D. YARBROUGH.

Copies of this patent may be obtained for five cents each, by addressing the "Commissioner of Patents, Washington, D. C."